United States Patent
Lu et al.

(10) Patent No.: US 9,116,577 B2
(45) Date of Patent: Aug. 25, 2015

(54) SENSING METHOD OF OPTICAL TOUCH

(71) Applicant: Wistron Corporation, New Taipei (TW)

(72) Inventors: Kuo-Hsien Lu, New Taipei (TW);
Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 55 days.

(21) Appl. No.: 14/182,299

(22) Filed: Feb. 18, 2014

(65) Prior Publication Data
US 2015/0145828 A1    May 28, 2015

(30) Foreign Application Priority Data
Nov. 28, 2013 (TW) .............................. 102143501 A

(51) Int. Cl.
*G06F 3/042* (2006.01)
(52) U.S. Cl.
CPC .................................... *G06F 3/0421* (2013.01)
(58) Field of Classification Search
None
See application file for complete search history.

(56) References Cited

U.S. PATENT DOCUMENTS

| 8,330,726 | B2 | 12/2012 | Ogawa et al. | |
|---|---|---|---|---|
| 2007/0125937 | A1* | 6/2007 | Eliasson et al. | 250/221 |
| 2011/0304587 | A1 | 12/2011 | Tsai et al. | |
| 2012/0105376 | A1* | 5/2012 | Park et al. | 345/175 |
| 2012/0113057 | A1* | 5/2012 | Kobayashi et al. | 345/175 |
| 2013/0057517 | A1* | 3/2013 | Kao et al. | 345/175 |
| 2014/0085264 | A1* | 3/2014 | Su et al. | 345/175 |

FOREIGN PATENT DOCUMENTS

TW    201145119    12/2011

OTHER PUBLICATIONS

"Office Action of Taiwan Counterpart Application" with partial English translation, issued on Mar. 25, 2015, p. 1-p. 10.

* cited by examiner

*Primary Examiner* — Jason Olson
*Assistant Examiner* — Krishna Neupane
(74) *Attorney, Agent, or Firm* — Jianq Chyun IP Office

(57) ABSTRACT

A sensing method of optical touch, adapted for providing and sensing a sensing beam through at least one optical sensing module, is provided. The sensing method of optical touch includes the following steps. A plurality of sensing pixel zones of the optical sensing module is selected, and a main incident angle is chosen in an incident angle range according to light intensity sensed by each of the selected sensing pixel zones, wherein the sensing beam entering the optical sensing module at the main incident angle has a maximum light intensity. Main incident angles corresponding to the unselected sensing pixel zones are computed according to the main incident angles corresponding to the selected sensing pixel zones.

10 Claims, 4 Drawing Sheets

SENSING METHOD OF OPTICAL TOUCH

CROSS-REFERENCE TO RELATED APPLICATION

This application claims the priority benefit of Taiwan application serial no. 102143501, filed on Nov. 28, 2013. The entirety of the above-mentioned patent application is hereby incorporated by reference herein and made a part of this specification.

BACKGROUND OF THE INVENTION

1. Field of the Invention

The invention relates to a sensing method and more particularly relates to a sensing method of optical touch.

2. Description of Related Art

Due to the convenient and highly-intuitive operation, touch electronic products are popular among the consumers and gradually become the main trend of the market in recent years. Among resistive, capacitive, and back projection touch screens that have been used for some time, the capacitive touch screen has the best touch performance but it is also the most expensive one. The production costs of the capacitive touch screen increase with its screen size, thus limiting the application. Optical touch technology that utilizes an optical sensing module to detect the touched position has been proposed as an alternative to the capacitive touch screen. The optical touch technology has advantages, such as low cost and good accuracy, etc., which is more competitive in the market. It thus has also become another option for large-sized touch screens.

Generally speaking, the way the optical touch technology performs sensing is through disposing a reflector and an optical sensing module on the edge of the screen, and causing the light provided by a light source being reflected by the reflector and transmitted to the optical sensing module. When a touch object is above the display surface and blocks a portion of the light reflected by the reflector, a shadow is formed on the optical sensing module, by which the position of the touch object is calculated.

However, for a large-sized touch screen, it is difficult to maintain the optical sensing module and the reflector on the same plane. Therefore, deformation of the touch plane may occur and influence the reflective efficiency of the reflector or even make it difficult to transmit the light provided by the light source through the reflector and to form the shadow on the optical sensing module. As a result, determination of the touch point is affected.

In order to overcome the difficulty in determining the touch point due to the deformation of the touch plane, an optical sensing module having an image sensing array is provided for receiving light that enters the optical sensing module within an incident angle range. Therefore, when the touch plane is deformed, different incident angles are selected for different sensing pixels of the optical sensing module to achieve stronger light intensity, so as to obtain better reflection signals for determining the touch point. However, the sensing method used by the current optical touch technology requires analysis on each sensing pixel of the optical sensing module in order to obtain the incident angles of stronger light intensity for determining the touch point, which takes much time.

SUMMARY OF THE INVENTION

The invention provides a sensing method of optical touch, capable of improving a touch sensing rate of an optical touch device.

The sensing method of optical touch of the invention is adapted for providing and sensing a sensing beam through at least one optical sensing module. The sensing beam travels through a touch sensing area and is reflected back to the optical sensing module by a reflector, wherein the sensing beam reflected by different positions of the reflector enters different sensing pixel zones of the optical sensing module in an incident angle range. The sensing method of optical touch includes the following steps. A plurality of sensing pixel zones of the optical sensing module is selected, and a main incident angle is chosen in an incident angle range according to a light intensity distribution sensed by each of the selected sensing pixel zones, wherein the sensing beam entering the optical sensing module at the main incident angle has a maximum light intensity. The main incident angles corresponding to unselected sensing pixel zones are calculated according to the main incident angles corresponding to the selected sensing pixel zones.

In an embodiment of the invention, the selected sensing pixel zones include a first sensing pixel zone, a second sensing pixel zone, and a third sensing pixel zone. The sensing beam received by the first sensing pixel zone is reflected back to the optical sensing module by a first border position of the reflector. The sensing beam received by the second sensing pixel zone and the third sensing pixel zone is reflected back to the optical sensing module respectively by a second border position and a third border position of the reflector. The first border position, the second border position, the third border position, and a fourth border position of the reflector, which is adjacent to the optical sensing module, respectively correspond to four corners of the touch sensing area.

In an embodiment of the invention, a distance between the first border position and the optical sensing module is greater than a distance between other positions of the reflector and the optical sensing module, and the first sensing pixel zone is located between the second sensing pixel zone and the third sensing pixel zone.

In an embodiment of the invention, the selected sensing pixel zones further include at least one fourth sensing pixel zone that is located between the first sensing pixel zone and the second sensing pixel zone.

In an embodiment of the invention, the selected sensing pixel zones further include at least one fifth sensing pixel zone that is located between the first sensing pixel zone and the third sensing pixel zone.

In an embodiment of the invention, the selected sensing pixel zones further include at least one fourth sensing pixel zone and at least one fifth sensing pixel zone, wherein the fourth sensing pixel zone is located between the first sensing pixel zone and the second sensing pixel zone, and the fifth sensing pixel zone is located between the first sensing pixel zone and the third sensing pixel zone.

In an embodiment of the invention, a method of calculating the main incident angles corresponding to the unselected sensing pixel zones includes performing a linear interpolation operation according to the main incident angles corresponding to the selected sensing pixel zones.

In an embodiment of the invention, the optical sensing module includes a light source and an image sensing array. The light source is adapted for providing the sensing beam. The image sensing array is adapted for sensing a light intensity of the sensing beam reflected by the reflector.

In an embodiment of the invention, the light source is a light emitting diode and the image sensing array is an area sensor.

In an embodiment of the invention, the sensing method of optical touch further includes calculating a touch coordinate according to a sensing result of the optical sensing module when the optical sensing module senses that the sensing beam is blocked.

Based on the above, the sensing method of optical touch of the invention is adapted for obtaining the main incident angles corresponding to each sensing pixel of the optical sensing module without respectively analyzing all the sensing pixels on the optical sensing module. Thereby, the optical sensing module obtains favorable reflection signals, which facilitates determination of the touch point and saves the operation time of the system. Therefore, high touch sensing rate is achieved when the optical touch device performs each touch sensing.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1A:
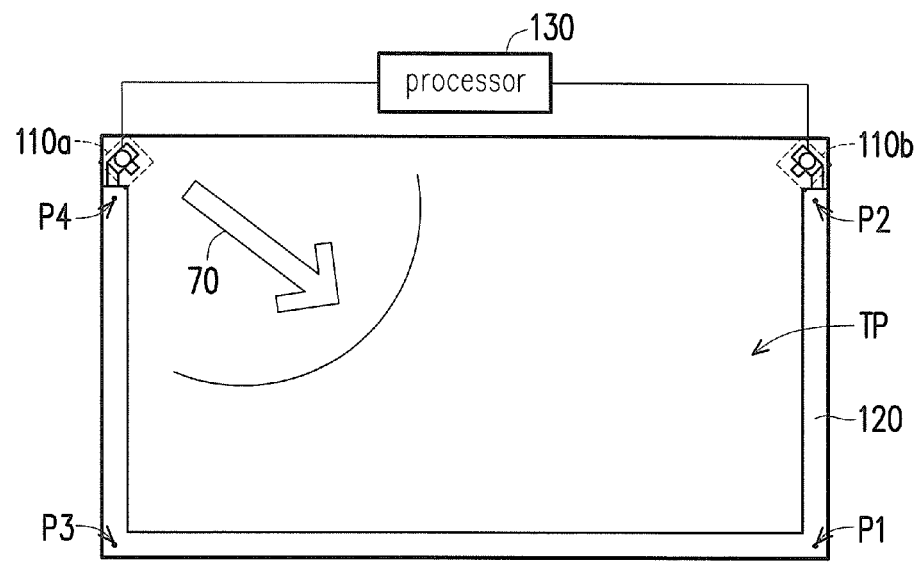
FIG. 1A is an architecture diagram of an optical touch device according to an embodiment of the invention.
Figure 1B:
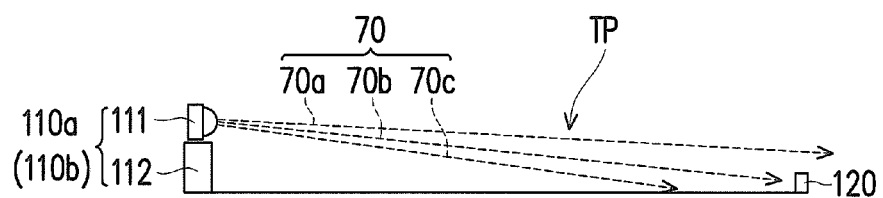
FIG. 1B is a side view of the optical touch device of FIG. 1A.

FIG. 1A is an architecture diagram of an optical touch device according to an embodiment of the invention. FIG. 1B is a side view of the optical touch device of FIG. 1A. Referring to FIG. 1A and FIG. 1B, an optical touch device 100 of the present embodiment includes two optical sensing modules 110a and 110b, a reflector 120, and a processor 130. For example, as shown in FIG. 1B, in the present embodiment, the optical sensing modules 110a and 110b each include a light source 111 and an image sensing array 112, wherein the light source 111 is adapted to provide sensing beams 70. For instance, the light source 111 may be a light emitting diode. Moreover, with reference to FIG. 1A to FIG. 1B, when the light source 111 of the optical sensing module 110a provides the sensing beams 70, the sensing beams 70 travel through a touch sensing area TA and are reflected back to the optical sensing module 110a by the reflector 120 to be sensed by the image sensing array 112 of the optical sensing module 110a, wherein the sensing beams 70 reflected by different positions of the reflector 120 enter different sensing pixel zones of the optical sensing module 110a. Moreover, in the present embodiment, the image sensing array 112 is an area sensor, for example, that is capable of sensing the sensing beams 70 which enter the optical sensing module 110a at different incident angles within an incident angle range and is adapted to sense light intensity of the sensing beams 70 reflected by the reflector 120.

Figure 2A:
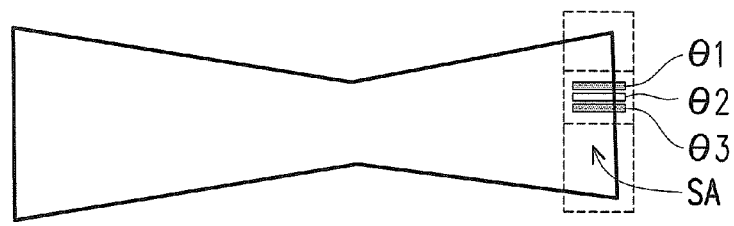
FIG. 2A is a schematic diagram of a sensing pixel zone of an image sensing array of FIG. 1A.

For example, referring to FIG. 1A to FIG. 1B again, when the optical touch device 100 is large in size, it is difficult to maintain the optical sensing module 110a (or the optical sensing module 110b) and the reflector 120 on the same plane, which may affect the reflective efficiency of the reflector 120. For example, as shown in FIG. 1B, the reflector 120 is capable of reflecting sensing beams 70a, 70b, and 70c all back to the optical sensing module 110a. However, because the sensing beams 70a and 70c are not totally reflected by the reflector 120, the light intensity of the sensing beams 70a and 70c sensed by the image sensing array 112 of the optical sensing module 110a is weaker, resulting in that each sensing pixel of the image sensing array 112 senses different light intensity of the sensing beams 70a, 70b, and 70c from different incident angles. 100301 FIG. 2A is a schematic diagram of the sensing pixel zone of the image sensing array of FIG. 1A. For instance, referring to FIG. 1B and FIG. 2A, in the present embodiment, incident angles at which the sensing beams 70a, 70b, and 70c enter a sensing pixel zone SA of the optical sensing module 110a are 01, 02, and 03 respectively. As shown in FIG. 2A, the sensing beam 70b that enters the sensing pixel zone SA of the optical sensing module 110a at the incident angle θ2 has the maximum light intensity (as shown in FIG. 2A). In other words, the incident angle θ2 is a main incident angle for the sensing beams 70 entering the sensing pixel zone SA. Here, the definition of the main incident angle corresponding to each sensing pixel zone is that the sensing beam 70 that enters the sensing pixel zone SA at the main incident angle has greater light intensity than the sensing beams 70 that enter the sensing pixel zone SA at other incident angles. That is to say, the sensing beam 70 that enters the optical sensing module 110a at the main incident angle has the maximum light intensity.

Furthermore, when the optical touch device 100 is large in size and causes a plane of the touch sensing area TA to deform, the main incident angles corresponding to the respective sensing pixel zones differ from one another. Therefore, in order to obtain favorable reflection signals for determining a touch point, when the optical touch device 100 performs touch detection, the processor 130 acquires the main incident angle corresponding to each sensing pixel zone so as to detect the sensing beams 70.

Figure 2B:
FIG. 2B is a schematic diagram of the image sensing array of FIG. 1A.

FIG. 2B is a schematic diagram of the image sensing array of FIG. 1A. On the other hand, when the sensing beams 70 are reflected back to the optical sensing module 110a by a corner of the reflector 120 which is relatively farther from the optical sensing module 110a, the light intensity is relatively weaker. Therefore, the incident angle range corresponding to the sensing pixel zone that the sensing beams 70 enter is relatively smaller. For example, as shown in FIG. 1A and FIG. 2B, the reflector 120 has a first border position P1, a second border position P2, a third border position P3, and a fourth border position P4 that is adjacent to the optical sensing module 110a. The first border position P1, the second border position P2, the third border position P3, and the fourth border position P4 respectively correspond to four corners of the touch sensing area TA. When the sensing beams 70 are reflected back to the optical sensing module 110a by the first border position P1, the second border position P2, and the third border position P3 of the reflector 120, the reflected sensing beams 70 are respectively received by a first sensing pixel zone SA1, a second sensing pixel zone SA2, and a third sensing pixel zone SA3 of the optical sensing module 110a, wherein the first sensing pixel zone SA1 is located between the second sensing pixel zone SA2 and the third sensing pixel zone SA3. To be more specific, the sensing beams 70 that enter the optical sensing module 110a at different incident angles respectively form bright area portions (i.e. white area in FIG. 2B) on the first sensing pixel zone SA1, the second sensing pixel zone SA2, and the third sensing pixel zone SA3. In the present embodiment, because a distance between the first border position P1 and the optical sensing module 110a is greater than distances between other positions of the reflector 120 and the optical sensing module 110a, the bright area on the first sensing pixel zone SA1 of the optical sensing module 110a is the smallest, which also means that selection of the incident angle range of the first sensing pixel zone SA1 is more limited.

Further, the difficulty in determining the touch point, resulting from deformation of the touch plane, is mostly caused by the problem that four corners of the touch sensing area TA do not fall on the same plane. Moreover, the main incident angles of the sensing pixel zones SA1, SA2, and SA3 that correspond to the corners of the touch sensing area TA are boundary values of a set of the main incident angles of all the sensing pixel zones. Thus, if the main incident angles of the sensing pixel zones SA1, SA2, and SA3 corresponding to the corners of the touch sensing area TA are obtained, the main incident angles corresponding to other sensing pixel zones between the sensing pixel zones SA1, SA2, and SA3 can be inferred therefrom indirectly.

Therefore, the optical touch device 100 of the present embodiment may first acquire the main incident angles corresponding to part of the sensing pixel zones and thereby calculate the main incident angles corresponding to other sensing pixel zones. Accordingly, the main incident angle corresponding to each sensing pixel can be obtained without respectively analyzing all the sensing pixels on the optical sensing module 110a, which is conducive to saving operation time of the system and improving touch sensing rate. Steps of a sensing method of optical touch in the present embodiment are explained in detail below with reference to FIG. 3A to FIG. 3C.

Figure 3A:
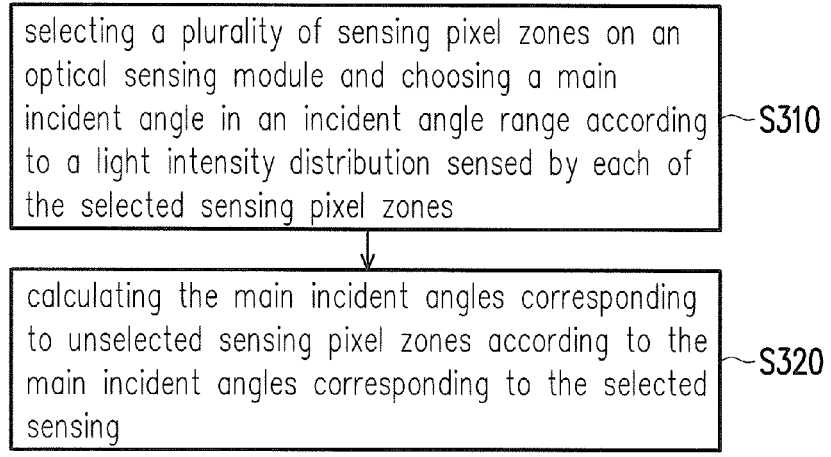
FIG. 3A is a flowchart showing a sensing method of optical touch according to an embodiment of the invention.
Figure 3B:
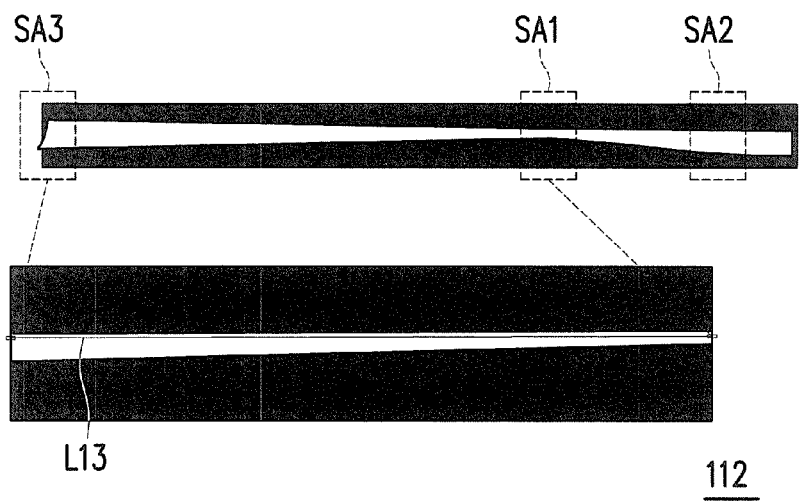
FIG. 3B is a schematic diagram of the image sensing array of the embodiment of FIG. 3A.

FIG. 3A is a flowchart showing a sensing method of optical touch according to an embodiment of the invention. FIG. 3B is a schematic diagram of the image sensing array of the embodiment of FIG. 3A. Referring to FIG. 3A, in the present embodiment, the sensing method of optical touch may be executed using the optical touch device 100 of FIG. 1, for example. Hereinafter, each component and module in the optical touch device 100 is referred to further describe the steps of the sensing method of optical touch of the present embodiment.

First, step S310 is executed to select a plurality of sensing pixel zones on the optical sensing module 110a and choose a main incident angle in an incident angle range according to a light intensity distribution sensed by each of the selected sensing pixel zones. For example, the selected sensing pixel zones may include the aforementioned first sensing pixel zone SA1, the second sensing pixel zone SA2, and the third sensing pixel zone SA3. Moreover, in the present embodiment, the sensing pixel zones include a plurality of sensing pixels therein for analyzing the main incident angle corresponding to the first sensing pixel zone SA1 located between the second sensing pixel zone SA2 and the third sensing pixel zone SA3. However, it should be noted that the invention is not limited thereto. In other embodiments, the sensing pixel zones may be one signal sensing pixel. The range of the sensing pixel zones may be designed by those skilled in the art according to their actual needs and thus details will not be repeated hereinafter.

Next, step S320 is executed to calculate the main incident angles corresponding to unselected sensing pixel zones according to the main incident angles corresponding to the selected sensing pixel zones. More specifically, in the present embodiment, a method of calculating the main incident angles corresponding to the unselected sensing pixel zones includes performing a linear interpolation operation based on the main incident angles corresponding to the selected sensing pixel zones.

To be more specific, when the processor 130 obtains the main incident angles corresponding to the first sensing pixel zone SA1, the second sensing pixel zone SA2, and the third sensing pixel zone SA3, it means that the processor 130 acquires the positions of the sensing pixels, which are able to receive the sensing beams 70 with the maximum light intensity, in the first sensing pixel zone SA1, the second sensing pixel zone SA2, and the third sensing pixel zone SA3. Thus, the processor 130 is capable of performing the linear interpolation operation accordingly. For instance, as shown in FIG. 3B, in the present embodiment, the processor 130 may perform the linear interpolation operation on the positions of the sensing pixels, which are able to receive the sensing beams 70 with the maximum light intensity, in the first sensing pixel zone SA1 and the third sensing pixel zone SA3, so as to obtain positions of the sensing pixels, which are able to receive the sensing beams 70 with the maximum light intensity, in the unselected sensing pixel zones (corresponding to a straight line L13 in FIG. 3B). That is, the processor 130 obtains the main incident angles corresponding to the unselected sensing pixel zones between the first sensing pixel zone SA1 and the third sensing pixel zone SA3.

In addition, the main incident angles corresponding to other sensing pixel zones between the first sensing pixel zone SA1 and the second sensing pixel zone SA2 and the positions of the sensing pixels that are able to receive the sensing beams 70 with the maximum light intensity may also be obtained by performing the linear interpolation operation on the positions of the sensing pixels, which are able to receive the sensing beams 70 with the maximum light intensity, in the first sensing pixel zone SA1 and the second sensing pixel zone SA2. The method is similar to the steps shown in FIG. 3B and thus is not repeated hereinafter.

Accordingly, with the sensing method of optical touch of the present embodiment, the main incident angle corresponding to each sensing pixel of the optical sensing module 110a is obtained without respectively analyzing all the sensing pixels on the optical sensing module 110a. Thereby, the optical sensing module 110a obtains favorable reflection signals, which facilitates determination of the touch point and saves operation time of the system.

Figure 4:
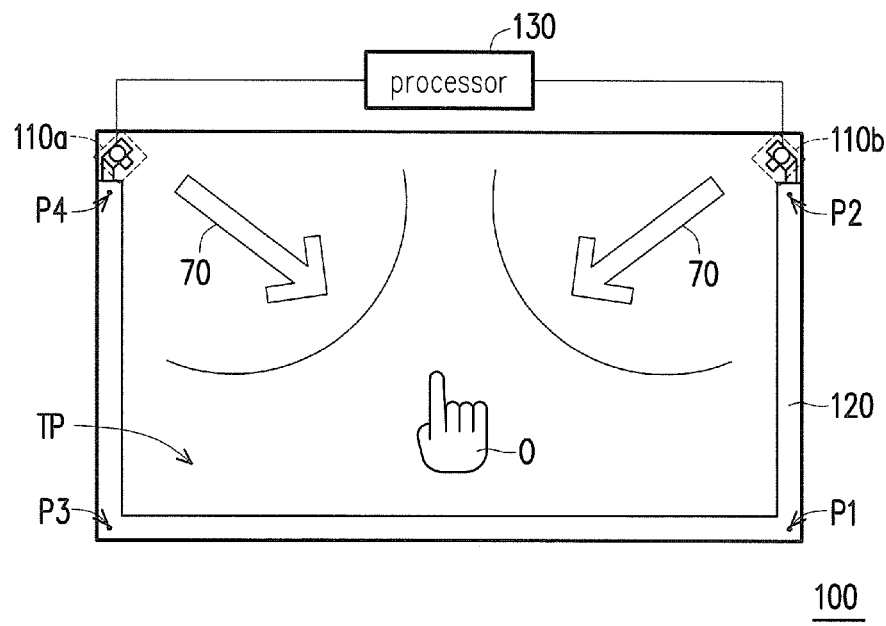
FIG. 4 is a schematic diagram illustrating an object touching the optical touch device of FIG. 1A.

FIG. 4 is a schematic diagram illustrating an object touching the optical touch device 100 of FIG. 1A. For example, referring to FIG. 4, when a touch object O is above the touch sensing area TA and blocks a portion of the light reflected by the reflector 120, shadows are respectively formed on the image sensing arrays 112 of the optical sensing modules 110a and 110b. Because the optical sensing modules 110a and 110b both obtain favorable reflection signals by the aforementioned sensing method, when the optical sensing modules 110a and 110b sense that the sensing beams 70 are being blocked, shadow signals caused by the touch object O are read and interpreted more easily. Then, the processor 130 calculates a touch coordinate using a triangulation method based on sensing results of the optical sensing modules 110a and 110b. Therefore, when the optical touch device 100 performs each touch sensing, the optical sensing modules 110a and 110b save the operation time of the system by the aforementioned sensing method of optical touch and increase the touch sensing rate of the optical touch device 100.

In the above embodiments, the selected sensing pixel zones include the first sensing pixel zone SA1, the second sensing pixel zone SA2, and the third sensing pixel zone SA3, for example; however, the invention is not limited thereto. Possible variations of the selected sensing pixel zones are further explained below based on FIG. 5.

Figure 5:
FIG. 5 is a schematic diagram of an image sensing array according to another embodiment of the invention.

FIG. 5 is a schematic diagram of an image sensing array according to another embodiment of the invention. A sensing method of optical touch in the present embodiment is similar to the sensing method of optical touch in the embodiment of FIG. 3A to FIG. 3C, and a difference therebetween is explained below. In the present embodiment, with reference to FIG. 5, the selected sensing pixel zones further include at least one fourth sensing pixel zone SA4 and at least one fifth sensing pixel zone SA5, wherein the fourth sensing pixel zone SA4 is located between the first sensing pixel zone SA1 and the second sensing pixel zone SA2, and the fifth sensing pixel zone SA5 is located between the first sensing pixel zone SA1 and the third sensing pixel zone SA3.

More specifically, in the present embodiment, after obtaining the main incident angles respectively corresponding to the fourth sensing pixel zone SA4 and the fifth sensing pixel zone SA5, it is an option to obtain the main incident angles corresponding to other unselected sensing pixel zones accordingly through the main incident angles respectively corresponding to the fourth sensing pixel zone SA4 and the fifth sensing pixel zone SA5. For instance, the main incident angles corresponding to other sensing pixel zones between the third sensing pixel zone SA3 and the fifth sensing pixel zone SA5 may be calculated based on the main incident angles corresponding to the third sensing pixel zone SA3 and the fifth sensing pixel zone SA5. The calculating method thereof is similar to the steps shown in FIG. 3B and thus is not repeated here. Moreover, the main incident angles corresponding to other unselected sensing pixel zones may also be calculated respectively based on the main incident angles corresponding to the fifth sensing pixel zone SA5, the first sensing pixel zone SA1, the second sensing pixel zone SA2, and the fourth sensing pixel zone SA4. The calculating method thereof is similar to the steps shown in FIG. 3B and thus is not repeated here.

Thus, when the size of the optical touch device 100 increases and makes the deformation of the touch sensing area TA more obvious, the sensing method of optical touch of the present embodiment can selectively obtain the main incident angle corresponding to the sensing pixel zone between the first sensing pixel zone SA1 and the second sensing pixel zone SA2 by segment through the fourth sensing pixel zone SA4, or obtain the main incident angle corresponding to the sensing pixel zone between the first sensing pixel zone SA1 and the third sensing pixel zone SA3 by segment through the fifth sensing pixel zone SA5, so as to more accurately calculate the main incident angles corresponding to the unselected sensing pixel zones and obtain favorable reflection signals. Accordingly, the sensing method of optical touch of the present embodiment can also be used to obtain the main incident angle corresponding to each sensing pixel of the optical sensing module 110a without respectively analyzing all the sensing pixels on the optical sensing module 110a, such that the optical sensing module 110a obtains favorable reflection signals to facilitate determination of the touch point and save the operation time of the system.

Moreover, it is worth mentioning that, although the present embodiment illustrates only one fourth sensing pixel zone SA4 or only one fifth sensing pixel zone SA5, the invention is not limited thereto. In other embodiments, the number of the fourth sensing pixel zone SA4 or the fifth sensing pixel zone SA5 may be plural. Alternatively, in another embodiment, the main incident angles corresponding to the unselected sensing pixel zones may be obtained selectively through one of the fourth sensing pixel zone SA4 and the fifth sensing pixel zone SA5. Those skilled in the art may increase or decrease the number of the fourth sensing pixel zone SA4 or the fifth sensing pixel zone SA5 according to their actual needs. Thus, details will not be repeated here.

Further to the above, by the sensing method of optical touch of the present embodiment, the optical sensing module 110a obtains favorable reflection signals to save the operation time of the system. Hence, the sensing method is also applicable to the optical touch device 100 of FIG. 1A to improve the touch sensing rate of the optical touch device 100, thereby achieving effects similar to those of the sensing method of optical touch of the embodiment of FIG. 3A. Details thereof will not be repeated here.

To conclude the above, the sensing method of optical touch of the invention is adapted for obtaining the main incident angle corresponding to each sensing pixel of the optical sensing module without respectively analyzing all the sensing pixels on the optical sensing module. Thereby, the optical sensing module obtains favorable reflection signals, which facilitates determination of the touch point and saves the operation time of the system. Therefore, high touch sensing rate is achieved when the optical touch device performs each touch sensing.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A sensing method of optical touch, adapted for providing and sensing a sensing beam through at least one optical sensing module, wherein the sensing beam travels through a touch sensing area and is reflected back to the optical sensing module by a reflector, and the sensing beam reflected by different positions of the reflector enters different sensing pixel zones of the optical sensing module in an incident angle range, the sensing method of optical touch comprising:
   selecting a plurality of sensing pixel zones on the optical sensing module and choosing a main incident angle in the incident angle range according to a light intensity distribution sensed by each of the selected sensing pixel zones, wherein the sensing beam that enters the optical sensing module at the main incident angle has a maximum light intensity; and
   calculating main incident angles corresponding to unselected sensing pixel zones according to the main incident angles corresponding to the selected sensing pixel zones.

2. The sensing method according to claim 1, wherein the selected sensing pixel zones comprise:
   a first sensing pixel zone, wherein the sensing beam received by the first sensing pixel zone is reflected back to the optical sensing module by a first border position of the reflector;
   a second sensing pixel zone; and a third sensing pixel zone, wherein the sensing beam received by the second sensing pixel zone and the third sensing pixel zone is reflected back to the optical sensing module respectively by a second border position and a third border position of the reflector, wherein the first border position, the second border position, the third border position, and a fourth border position of the reflector, which is adjacent to the optical sensing module, respectively correspond to four corners of the touch sensing area.

3. The sensing method according to claim 2, wherein a distance between the first border position and the optical sensing module is greater than a distance between other positions of the reflector and the optical sensing module, and the first sensing pixel zone is located between the second sensing pixel zone and the third sensing pixel zone.

4. The sensing method according to claim 3, wherein the selected sensing pixel zones further comprise at least one fourth sensing pixel zone that is located between the first sensing pixel zone and the second sensing pixel zone.

5. The sensing method according to claim 3, wherein the selected sensing pixel zones further comprise at least one fifth sensing pixel zone that is located between the first sensing pixel zone and the third sensing pixel zone.

6. The sensing method according to claim 3, wherein the selected sensing pixel zones further comprise at least one fourth sensing pixel zone and at least one fifth sensing pixel zone, the fourth sensing pixel zone is located between the first sensing pixel zone and the second sensing pixel zone, and the fifth sensing pixel zone is located between the first sensing pixel zone and the third sensing pixel zone.

7. The sensing method according to claim 1, wherein a method of calculating the main incident angles corresponding to the unselected sensing pixel zones comprises:
    performing a linear interpolation operation according to the main incident angles corresponding to the selected sensing pixel zones.

8. The sensing method according to claim 1, wherein the optical sensing module comprises:
    a light source adapted for providing the sensing beam; and
    an image sensing array adapted for sensing a light intensity of the sensing beam reflected by the reflector.

9. The sensing method according to claim 8, wherein the light source is a light emitting diode and the image sensing array is an area sensor.

10. The sensing method according to claim 1, further comprising:
    calculating a touch coordinate according to a sensing result of the optical sensing module when the optical sensing module senses that the sensing beam is blocked.

* * * * *